Patented Aug. 25, 1942

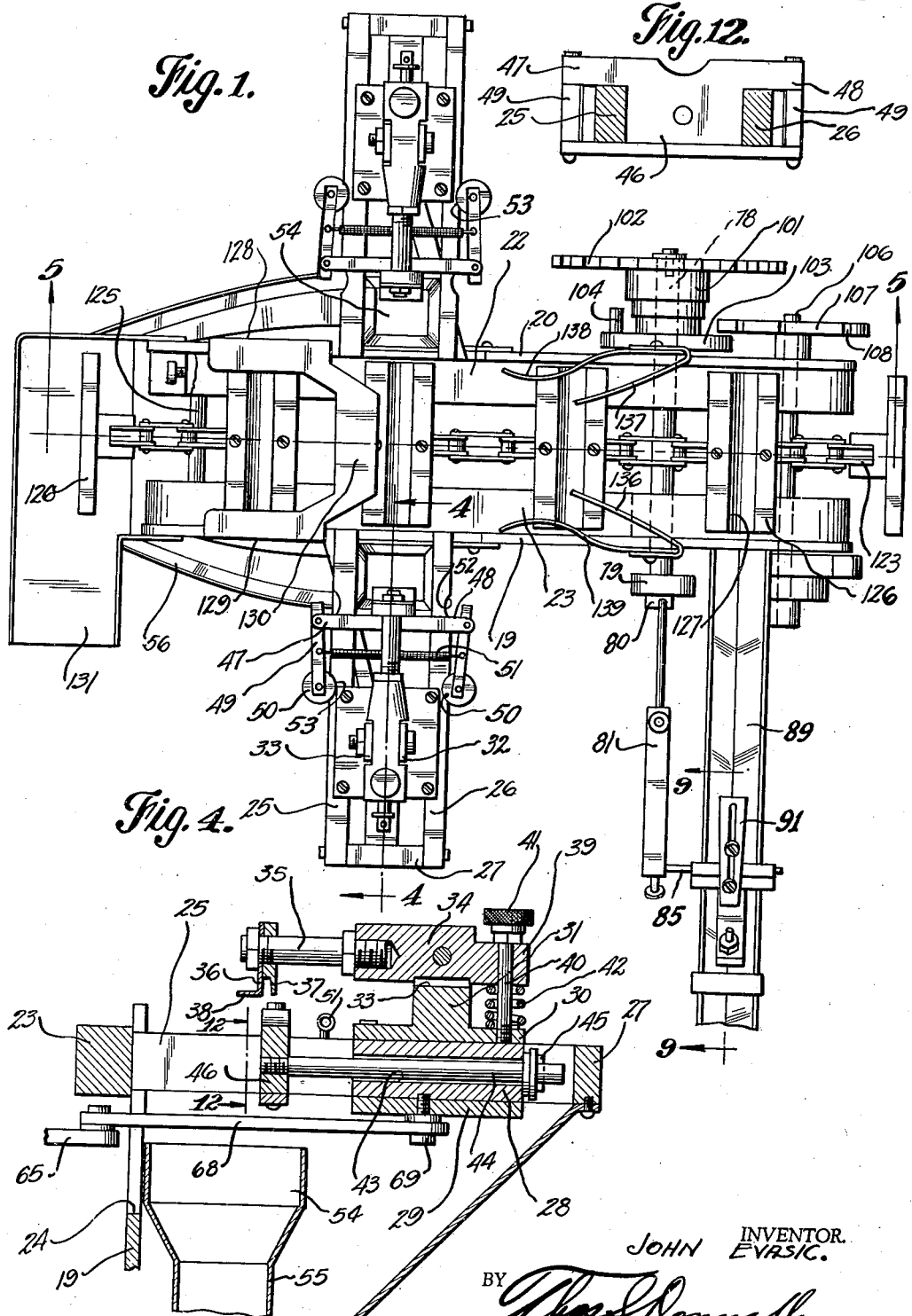

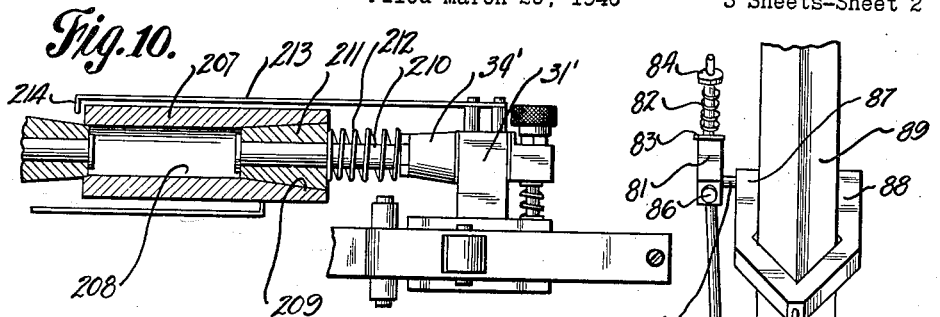
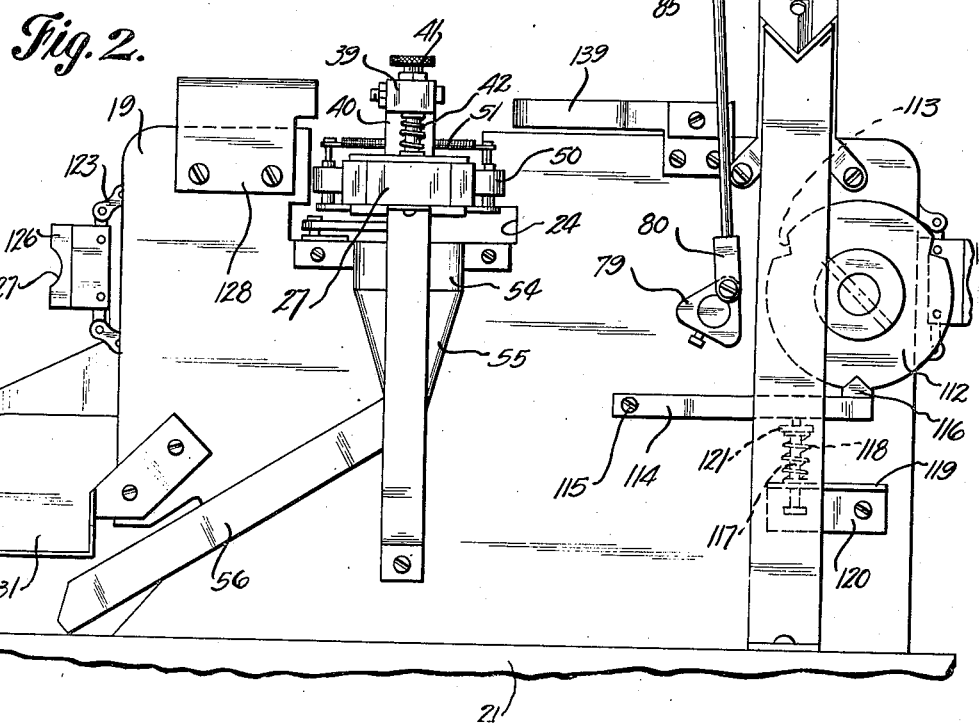
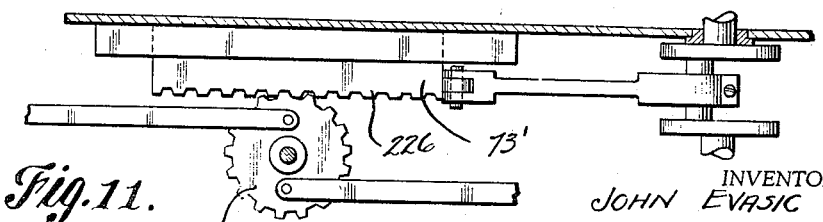

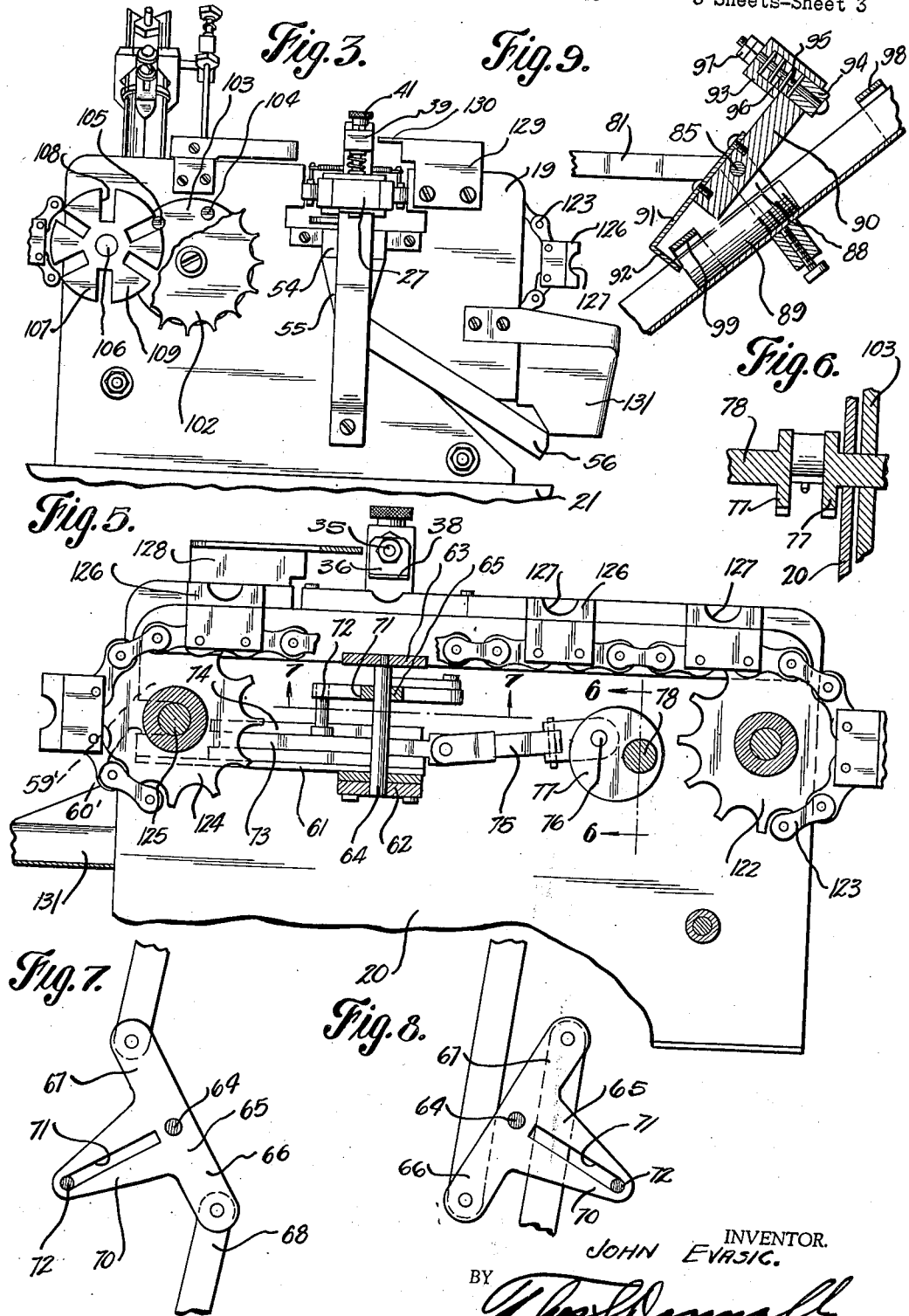

2,293,976

UNITED STATES PATENT OFFICE 2,293,976

STOCK FEEDING MACHINE

John Evasic, Detroit, Mich.

Application March 20, 1940, Serial No. 325,039

4 Claims. (Cl. 198—33)

My invention relates to a new and useful improvement in a stock feeding machine adapted for use in feeding stock into a chute or other conveyor with the stock positioned in a predetermined position relative to its ends.

The invention is particularly adapted for use in feeding studs of various types. In the use of these studs it is necessary that they be fed into a working machine which may serve to thread one end of the stud or to bore one end of the stud with the proper end inserted into the machine. Threaded studs which are threaded on opposite ends are threaded at their opposite ends in opposite directions so that upon operating upon these studs in the threading machine it is necessary that the stud be threaded inwardly from one end a predetermined distance and then inverted and threaded inwardly from the opposite end. This necessitates a reversing of the stud and, since these studs are generally threaded in automatic machines, when the threaded pieces of stock are discharged from the machine they are moved so that it becomes necessary, under present conditions, to locate the studs, as to their ends, in the feeding machine by a manual operation. This, of course, requires considerable labor and the expenditure of considerable time.

In forming wrist pins, the wrist pins are generally provided with a bore extending therethrough which is counterbored inwardly at each end.

Frequently, in operating upon studs, the blank stud is provided with a spherical surface at one end and a flat surface at the opposite end, the spherical surface generally being fed into the threading or other operating machine.

It is an object of the present invention to provide a machine whereby such pieces of material may be mechanically operated upon so as to feed the same into a delivery chute which will serve to deliver the stock of material with a predetermined end into the feeding machine.

It is another object of the present invention to provide a feeding machine of this type which will be simple in structure, economical of manufacture, durable, compact, easily operated and highly efficient in use.

Another object of the invention is the provision in a machine of this type of a pair of oppositely disposed gripping members so arranged and constructed that when the stud lies on the conveyer with its ends in one direction, one of the gripping members will operate and when the stud lies on the conveyer inverted end for end, the other gripping member will operate for removing the stud from its location and depositing it in a chute.

Another object of the invention is the provision of a machine whereby the feeding of pieces of stock with a predetermined end advancing may be done rapidly and with a minimum of labor.

Other objects will appear hereinafter.

It is recognized that various changes and modifications may be made in the detail of structure disclosed and it is intended that such variations and modifications shall be embraced within the claims appended hereto and forming a part hereof.

Forming a part of the specification are drawings, in which,

Fig. 1 is a top plan view of the invention with a part broken away,

Fig. 2 is a side elevational view of the invention,

Fig. 3 is a side elevational view of the invention from the side opposite to that of Fig. 2 with the machine slightly reduced and with a part broken away, Fig. 4 is a sectional view taken on line 4—4 of Fig. 1, Fig. 5 is a sectional view taken on line 5—5 of Fig. 1, Fig. 6 is a fragmentary sectional view taken on line 6—6 of Fig. 5, Fig. 7 is a fragmentary sectional view taken on line 7—7 of Fig. 5 showing the parts in one position, Fig. 8 is a view similar to Fig. 7 showing the parts in another position, Fig. 9 is a fragmentary sectional view taken on line 9—9 of Fig. 1, Fig. 10 is a fragmentary sectional view showing a modified form of construction, Fig. 11 is a fragmentary sectional view showing another modification of the invention.

Fig. 12 is a sectional view taken on line 12—12 of Fig. 4.

The invention embodies a pair of spaced apart supporting plates 19 and 20 which are suitably secured to a base 21 and which project upwardly therefrom. Mounted on the inner face of these supporting plates, adjacent the upper edge thereof, is a pair of slide rails 22 and 23 which extend from the rear end to the front end of the plates. Each of these plates 19 and 20 is cutaway and provided with a notch 24 in its upper edge. (See Fig. 2.) The construction at each of these notched-out portions is the same so that a description of one will suffice for both. Secured to the rail 23 and projecting outwardly therefrom is a pair of spaced apart supporting rails 25 and 26 connected at their outer ends by the cross rail 27 to provide a supporting frame. (See Fig. 4 and Fig. 13.) Slidably positioned in this supporting frame, between the rails 25 and 26, is a carriage block 28, secured to the lower face of which is a plate 29. A similar plate 30 is secured to the upper face of the block 28. These plates 29 and 30 extend beyond the edges of the block 28 and overlie the side rails 25 and 26 so that the block 28 is slidably mounted between these rails 25 and 26. Projecting upwardly from the plate 30 is a standard 31 which is bifurcated at its upper end to provide the spaced apart legs 32 and 33 between which is pivotally mounted a carrying block 34. Projecting outwardly from the forward end of the block 34 is a stud 35 carrying on its outer end a presser member 36 and a gripper 37, the member 36 having the horizontally disposed flange 38. This member 36 is preferably formed from slightly yieldable material such as light leaf spring. Projected through an extension 39 of the member 34 is a screw 40 threaded into the plate 30 and provided with a knurled knob 41 whereby this screw may be rotated. Embracing the screw 40 and lying between the upper surface of the plate 30 and the lower surface of the extension 39 is a spring 42 which tends normally to rock the member 34 upwardly at its rear end and downwardly at its forward end. By threading the screw 40 inwardly or outwardly of the plate 30, the tension of the spring 42 may be adjusted. This construction is present at both sides of the structure.

Slidably projected through a passage 43 in the block 28 is a rod 44 having a nut or collar 45 fixedly mounted on one end and threaded at its opposite end into a saddle plate 46 which is provided at its opposite ends with the stirrup portions 47 and 48 which embrace the rails 25 and 26. Pivotally mounted at one end on the stirrup portions 47 and 48 are rocker arms 49 each carrying at its free end a roller 50. (See Fig. 1.) These rocker arms are connected together by a spring 51 which serves normally to maintain the rollers in engagement with the outer faces of the rails 25 and 26. Each of these rails is provided on its outer face with the spaced apart notches or pockets 52 and 53.

The construction is such that when the block 28 is slid inwardly of the machine, that is, to the left in Fig. 4, the rocker arms will be in the position where the rollers are in engagement with the outer recesses 53 and the saddle 46 will remain stationary until the block 28 engages against this saddle whereupon the saddle 46 will ride inwardly of the machine in engagement with the block 28. This movement will continue until the rollers begin riding into the pockets or recesses 53 and when they have ridden in a predetermined distance, these rollers will ride rapidly into the recesses or pockets 53 because the arms 49 will be pulled inwardly by the spring 51, thus, causing the saddle to suddenly move out of engagement with the block 28 and strike against the outer face of the rail 23. In the normal operation of the machine the block 28 will continue its movement to take up this space so as to again engage against the outer face of the saddle 46. Similarly, when the block 28 is moving in the opposite direction, the block will move outwardly until it engages the collar on the end of the rod 44 upon which the stirrup will be carried outwardly and as the rollers ride into the recess 53, the stirrup will be snapped outwardly so that the collar 45 will move out of engagement with the block 28.

Mounted on the outer face of each of the side walls 19 and 20 is a hopper 54 having an outlet spout 55 adapted to discharge into a delivery trough 56.

Carried on the inner face of the walls 19 and 20 are spaced blocks 49′, having a recess 60′ formed in their outer faces. Connected to the under surface of the block 59′ and extending rearwardly therefrom (see Fig. 5) is a plate 61 which extends to and is connected to the cross plate 62 which connects to the opposite side wall 19. A plate 63 is secured to the bottom face of the rails 23 and 22 and is positioned in alignment with the plate 62. These plates serve as supports for the vertical shaft 64 which serves as a pivot for the bell crank 65 fixedly mounted thereon, the shaft 64 being rotatable. This bell crank is provided with the lateral wings 66 and 67, each of these wings being pivotally connected at its outer end to a pitman 68, the other end of which is connected by the stud 69 to the block 28. The rocking of the bell crank effects a reciprocation of the blocks 28, these blocks moving inwardly and outwardly in unison with each other. A central projection 70 on the bell crank 65 is provided with an elongated slot 71 in which slidably engages the pin 72 which projects upwardly from the slidable bar 73, this bar riding between the plate 61 and the plate 74 which is fixedly mounted on the inner face of the plate 20, the bar 73 being of sufficient width that it may engage at one edge between the plates 61 and 74 and carry on its outwardly projecting portion the pin or stud 72. The bar 73 is reciprocated by means of the pitman 75 connected by the pin 76 eccentrically to the disc 77 which is eccentrically mounted upon the shaft 78, this shaft projecting through the plates 19 and 20. Fixedly mounted on one end of the shaft 78 in spaced relation to the outer face of the plate 19 is a crank-forming plate 79 to which is pivotally connected, at one of its ends, a rod 80. This rod projects through a trip arm 81, a spring 82 embracing the upper end of the rod so as to engage at its lower end a washer 83 resting upon the upper face of the trip arm 81 and at its upper end a nut 84 threaded on the rod 80. This trip arm is fixedly secured adjacent its opposite end to a shaft 85, the set screw 86 serving as a means for fixing the arm 81 relatively to the shaft 85. This shaft 85 projects through the arms 87 and 88 of a yoke which is secured in embracing relation to a delivery trough 89. Fixedly mounted on the shaft 85 between the yoke arms 87 and 88 so as to lie in registration with the open side of the trough 89 is a releasing arm 90 having at one end the forwardly projecting engagement member 91 provided with the downwardly turned portion 92. At the opposite end, the member 90 is provided with the head 93 in which is slidably mounted a plunger 94 normally pressed outwardly by the spring 95. This plunger 94 is provided with a stem 96 on which the nuts 97 are threaded so that the width of projection of the plunger 94 upon the face of the member 90 may be adjusted.

The construction is such that upon a rocking of the shaft 85, the member 90 is rocked. Secured to and extending across the trough above the member 90 and above the angularly turned portion 92 are the cross bars 98 and 99 which serve as sorters or straighteners for straightening out studs which are passing downwardly in the trough 89. When the shaft 78 is rotated, the rod 80 will be reciprocated so that the arm or member 81 will be rocked upwardly and downwardly so as to rock the shaft 85. When the releasing arm 90 is rocked upwardly at its upper end in Fig. 9, the angularly turned portion 92 will be projected into the trough 89 and engage a stud which is sliding down the trough and prevent its passage. When the member 90 is rocked upwardly, at its lower end, the stud engaged by the portion 92 will be released to slide downwardly of the trough 89 and, at the same time the plunger 94 will move into the trough to engage the next stud and prevent its passage down the trough.

Fixedly mounted on the shaft 78 outwardly from the face of the plate 20 is a hub 101 carrying at its outer end a sprocket wheel 102 and at its inner end a disc 103. Projecting outwardly from the outer face of this disc 103 is a pair of spaced studs or indexing pins 104 and 105. (See Fig. 1 and Fig. 3.)

Projecting through the plates 19 and 20 at their rear ends is a shaft 106 on the outer end of which is fixedly mounted a disc 107 provided with radially extended slots 108 to divide the disc into the segments 109. These slots are so arranged that when the shaft 78 is rotated, the studs 105 and 104 will successively engage in the radially extended slots 108. In Fig. 3 the drawing illustrates the stud 105 engaging in one of these slots, the sprocket wheel 102 being rotated counter-clockwise. As this rotation continues, the stud 105 will cause the disc 107 to rotate clockwise effecting a rotation of the shaft 106 on which this disc is mounted. As the rotation of the shaft 78 continues, the stud 104 will engage the next successive slot formed in the disc 107 so that with each revolution of the shaft 78 the shaft 106 will be caused to rotate a predetermined distance.

The construction is such that when the shaft 106 is stationary, the arm 90 is rocked upwardly to releasing position and returns to downwardly rocked position before the studs 105 and 104 again engage the disc 109. Consequently, the stud to be fed into the machine is released from the trough 89 while the shaft 106 is stationary.

Fixedly mounted on the shaft 106 outwardly from the plate 19 is a disc 112 having notches 113 formed in its periphery. A rockable arm 114 is mounted on the outer face of the plate 19 by a screw 115 projected through one end of the arm 114. The opposite end carries a nose 116 which engages the periphery of the disc 112 and is normally held pressed against the disc by the plunger 117 pressed thereagainst by the spring 118, this plunger extending through a horizontal flange 119 extending outwardly from the bracket 120 which is mounted on the plate 19. (See Fig. 2.) One end of the spring 118 bears against this flange 119 and the other end against a collar 121 fixedly mounted on the plunger 117. This mechanism serves as a brake to prevent continued rotation of the shaft 106 after the studs 104 and 105 ride out of the slots with which they engage.

Fixedly mounted on the shaft 106 so as to lie centrally between the plates 19 and 20 is a sprocket wheel 122 around which is adapted to travel an endless sprocket chain 123, this sprocket chain passing around the sprocket wheel 124 which is mounted on the shaft 125, this shaft being engaged in the notches 60 and 60'.

Mounted on this sprocket chain 123 and extending transversely thereof are carrying plates 126 each having on its upper face a longitudinally directed groove 127 for reception of a stud or the like. The grooves on these carrying plates are open on their opposite ends, the groove extending across the plate. These plates ride on the upper face of the rails 22 and 23 when making the forward or delivery movement.

Mounted on the side plates is a U-shaped structure having the legs 128 and 129, the bight 130 extending over the space between these plates and serving to prevent upward slapping of the conveyor formed from the plates 126 and the sprocket chain 123.

Secured to the plates 119 and 120 at their forward ends and extending forwardly thereof is a discard trough 131 into which the discarded or rejected pieces are deposited.

Mounted on the side plates so as to overlie the conveyor are the centering springs 136, 137, 138 and 139, these springs being used for centering the stud on the plate 126.

In operation a suitable hopper would be mounted so as to communicate with the trough 89 and into this hopper would be dumped the studs or similar articles which it is desired to feed, the hopper discharging freely into the trough 89. The shaft 78 would be rotated by a suitable motor driving the sprocket wheel 102 through a suitable sprocket chain. This shaft would be driven counter-clockwise in the view shown in Fig. 3. When the studs 105 and 104 engage in the slots 108 they will effect a rotation of the disc 107 and a consequent travel of the conveyor or chain to the left of Fig. 1. At the same time, the bell crank 65 will be rocked on its pivot to move the blocks 28 inwardly toward each other, the grooved plate 126, previously in registration with the blocks, moving out of its position in registration with the blocks 28 so that the blocks 28 will move inwardly to their innermost position and remain stationary before the next succeeding plate 126 is carried by the chain into registration therewith. This movement of the bell cranks is effected through the eccentric 77 and the connections thereto, including arms 75, as clearly shown in Fig. 5. As this movement continues, the next succeeding plate 126 will be carried into the position where the groove is in alignment with the member 35. Before passing into this position from beneath the chute, the studs or other articles thereon will have been centered by the springs 136 and 137 so that the threaded portion will be in alignment with the member 37 either on one side or the other and the stud will be carried into position where the thin plate 37 will engage in one of the threads. The device, of course, has to be adjusted to accommodate a particular size of stud. When this position is reached, the stud 104 will ride out of engagement with its slot 109 and the shaft 106 will remain stationary. The sprocket wheel 102 will, of course, continue to rotate so that the shaft 78 rotates and the bell crank 65 will have passed dead center and be rotated on its reverse movement to move the blocks 28 outwardly from each other. The member 37 which has engaged the threads of the stud will drag the stud outwardly out of the groove of the plate 126 across a recess formed in the upper face of the member 46. This member 46 will remain stationary until the blocks engage the collar 45. When this has been accomplished, the block 28 will be in spaced relation to the member 46 and the stud will rest upon the upper edge of the member 46. As the outward movement continues, the saddle 46 will travel with the block 28. As the blocks 28 move outwardly, the cam 79 will have passed its lower dead center and the rod 80 will be moved upwardly to raise the portion 92 out of engaging position with a stud in the trough 89 and permit this stud to slide downwardly. The spacing of the plates 126 is such that when one of the plates is in alignment with the member 35 another plate, the second succeeding plate 126, is in alignment with the trough 89. When the stud lying in the trough is released to drop downwardly, it passes by gravity on to the plate 126 which is in alignment with the lower end of the trough and the cam 79 continues to rotate so as to again rock the member 90 downwardly to release another stud for travel down the trough 89 to engage the member 92. This will have been accomplished as the blocks 28 reach their outermost position and the studs 104 and 105 will have moved into the position shown in Fig. 3 so that further rotation of the sprocket 102 will again effect a rotation of the disc 107 to repeat the movement.

As the blocks 28 move inwardly from their outermost position, the member 37 engaging the threads of the stud will drag the stud off of the upper edge of the saddle plate 46 from which it will drop downwardly into the hopper 54 from which it will pass into the chute 55 with the unthreaded end in advance.

In this way a simple and effective means is provided for quickly and easily placing the studs in a chute or trough with the unthreaded end in advance. This trough would, of course, be so located on an automatic milling or threading machine as to deposit the studs in the feeding trough of the automatic machine.

Should an unthreaded stud or a stud of a smaller size than the device is adjusted for pass on to one of the plates 126, the member 37 would not engage any threads and, consequently, on the outward movement the stud would not be dragged off of the plate 126 on which it rested. It would be carried forward and as the plate 126 travels around the sprocket wheel 134, the rejected stud would be discharged by gravity into the hopper or chute 131 from which it would pass into a suitable receptacle or other container for disposal.

In Fig. 10 I have shown a slightly modified form of the invention in which the invention is adapted for use on wrist pins and the like. In the treatment of the wrist pins 207 which are formed from cylindrical hollow stock, one end of the bore 208 is reamed out to provide the tapered enlargement 209 and this operation is performed on one end of the wrist pin 207 by an automatic boring or reaming machine and then it is fed into the same machine reversed end for end and the same difficulty is encountered in quickly and inexpensively reversing these wrist pins for feeding into the machine as is encountered in the feeding in of studs. The machine used for wrist pins would be in all respects similar to the machine described except for the reversing mechanism. Instead of the rod 35 and the members 36, 37 and 38, I provide a rod 210 carrying a tapered plug 211 on its end. The rod 210 is slidably projected into the block 34' and normally pressed outwardly by the spring 212. Carried by the block 31' and projecting inwardly therefrom is a spring arm 213 having a downwardly turned end 214.

In the operation of this mechanism the wrist pins would be fed as described and as the blocks 28 moved inwardly the tapered plug 211 which is directed toward the end having the tapered bore 209 would enter this bore permitting the angularly turned end 214 of the spring arm 213 to ride over and engage behind the end of the wrist pin 207. The other block could not enter the bore 208 and would merely be forced rearwardly against the compression of its spring 212.

In Fig. 11 I have shown a slightly different form of mechanism which may be substituted for the bell crank 66. In this form the bar 73' is provided with teeth 226 to form a rack bar and the bell crank is replaced by a pinion 227.

What I claim as new is:

1. In a stock feeding machine of the class described, adapted for feeding stock threaded at one end: an endless conveyor; a plurality of stock receiving members on said conveyor in spaced relation to each other, each having a groove open at both ends for reception of stock deposited thereon; a stock delivery member for delivering stock to said stock receiving members; a pair of oppositely disposed, oppositely movable members; means for periodically moving said conveyor, said conveyor, while stationary, retaining a stock receiving member stationary in alignment with said stock delivery member, and a stock receiving member in alignment with said oppositely movable members; means operable while said conveyor is stationary for releasing a piece of stock for passage from said stock delivery member to a stock receiving member in alignment therewith; means operable, during the driving of said conveyor, for moving said oppositely movable members toward each other over the path of travel of an approaching stock receiving member and retaining said oppositely movable members stationary over said path of travel and operable, while said conveyor is stationary, for moving said oppositely movable members away from each other clear of the path of travel of said stock receiving member; and means on each of said oppositely movable members engageable with the threads of a threaded portion of the stock delivered thereagainst and adapted, upon retractive movement of said oppositely movable members away from each other, for moving the piece of stock clear of the stock receiving member; and means for releasing the piece of stock from the retracting oppositely movable member.

2. In a stock feeding machine of the class described, adapted for feeding elongated pieces of stock having a portion thereof threaded: a stock delivery member; an endless conveyor; a plurality of stock receiving members on said conveyor in spaced relation, each provided with a groove open at both ends for reception of a piece of stock from said stock delivery member; means for periodically actuating said conveyor for retaining, periodically, one of said stock receiving members stationary in alignment with said stock delivery member and periodically moving the same out of said alignment; means operable during the stationary alignment of a stock receiving member with said stock delivery member for releasing a piece of stock for passage from said stock delivery member to said stock receiving member, said stock receiving members being extended transversely of said conveyor; a pair of stock removing members on opposite sides of said conveyor and extending transversely thereof and each embodying a removing arm movable inwardly and outwardly of said conveyor, the removing arms on opposite sides moving in opposite directions in unison, there being a stock receiving member in alignment with said removing arms during the interruption of the driving of said conveyor; means for moving said arms inwardly toward each other over the path of travel of an approaching stock receiving member during the driving of said conveyor and retaining said arms in such position until the movement of said stock receiving member into alignment with said arms; means for moving said arms outwardly of each other during the stationary alignment of said stock receiving member therewith; and means on each of said arms adapted for engaging the thread of a piece of stock upon delivery of the threaded portion thereof into engagement therewith for, upon outward movement of said arms, dragging the piece of stock clear of the stock receiving member.

3. In a stock feeding machine of the class described, adapted for feeding elongated pieces of stock having a portion thereof threaded: a stock delivery member; an endless conveyor; means for driving said conveyor in one direction; a plurality of stock receiving members mounted transversely on said conveyor in spaced relation to each other and each provided with a groove open at both ends for the reception of a piece of stock from said stock delivery member; means for periodically actuating said conveyor for retaining, periodically, one of said stock receiving members stationary in alignment with said stock delivery member; means operable, during the stationary alignment of a stock receiving member with said stock delivery member, for releasing a piece of stock for passage from said delivery member to said stock receiving member; a pair of stock removing members on opposite sides of said conveyor and extending transversely thereof and each embodying a removing arm movable inwardly and outwardly of said conveyor, the removing arms on opposite sides moving in opposite directions in unison; means for moving said arms inwardly toward each other during the driving of said conveyor for extending said arms over the path of travel of the approach of a stock receiving member; and moving said arms outwardly clear of said stock receiving member upon the interrupting of the driving of said conveyor; means on the inner end of each of said arms adapted for engaging a threaded portion of a piece of stock carried by the stock receiving member into engagement therewith and effecting, upon the outward movement of said arm, a dragging of said piece of stock clear of said stock receiving member; and means movable by each of said arms for disengaging the arm from said piece of stock.

4. In a stock feeding machine of the class described, adapted for feeding stock threaded at one end: an endless conveyor; a plurality of stock receiving members on said conveyor in spaced relation to each other, each having a groove open at both ends for reception of stock deposited thereon; a stock delivery member for delivering stock to said stock receiving members; a pair of oppositely disposed, oppositely movable members; driving means for periodically moving said conveyor, said conveyor, while stationary, retaining a stock receiving member stationary in alignment with said stock delivery member, and a stock receiving member in alignment with said oppositely movable members; means operable while said conveyor is stationary for releasing a piece of stock for passage from said stock delivery member to a stock receiving member in alignment therewith; means operable, during the driving of said conveyor, for moving said oppositely movable members toward each other over the path of travel of an approaching stock receiving member and retaining said oppositely movable members stationary over said path of travel and operable, while said conveyor is stationary, for moving said oppositely movable members away from each other clear of the path of travel of said stock receiving member; and means on each of said oppositely movable members engageable with the threads of a threaded portion of the stock delivered thereagainst and adapted, upon retractive movement of said oppositely movable members away from each other, for moving the piece of stock clear of the stock receiving member.

JOHN EVASIC.